Patented Dec. 12, 1939

2,182,786

UNITED STATES PATENT OFFICE 2,182,786

HYDROXY-ALKYL ETHERS OF BENZO-PHENONE

Gerald H. Coleman and Clarence L. Moyle, Midland, Mich., assignors to The Dow Chemical Company, Midland, Mich., a corporation of Michigan No Drawing. Application September 14, 1938, Serial No. 229,873

7 Claims. (Cl. 260—591)

The invention relates to the hydroxy-alkyl ethers of hydroxy-benzophenones, and hydroxy-benzophenones in which one or both of the benzene nuclei are substituted by chlorine or bromine. These are new compounds and have been found useful as modifying agents in cellulose ether and ester compositions.

The new compounds may be prepared by reacting an hydroxy-benzophenone or a nuclear halogenated derivative thereof with an alkylene-chlorohydrin in the presence of an alkali. For example, an hydroxy-benzophenone may be dissolved in an excess of aqueous caustic alkali, the solution heated to a moderate temperature, and the alkylene-chlorohydrin gradually added with stirring. After the chlorohydrin has been added, heating may be continued for a period of time sufficient to complete the reaction, after which the crude product may be isolated in any suitable manner. If desired, a suitable organic solvent, such as ethanol, may be employed in the reaction mixture to increase the solubility of the hydroxy-benzophenone therein, and the reaction carried out at the reflux temperature of the mixture. The compounds may also be formed by reacting an hydroxy-benzophenone with an alkylene oxide.

The chloro- and bromo-hydroxy-benzophenones may be prepared by several methods. For example, hydroxy-benzophenone may be directly chlorinated or brominated. The halogen-containing compounds may also be made by condensing a halo-phenol with benzoyl chloride or a halo-benzoyl chloride in the presence of anhydrous ferric chloride.

The following examples illustrate certain embodiments of our invention, but are not to be construed as limiting the same:

Example 1

A mixture of 198 grams (1 mol) of 4-hydroxy-benzophenone, 40 grams (1 mol) of sodium hydroxide, and 250 milliliters of 30 per cent aqueous ethanol was warmed to 55° to 60° C., and 1 mol of ethylene chlorohydrin, as the 42 per cent aqueous azeotrope, added portion-wise thereto over a period of one hour. The reaction mixture was thereafter maintained at a temperature of 55° to 60° C. for several hours, then diluted with an excess of water, and cooled to room temperature. The desired ether compound precipitated from solution and was separated by filtration. The residue from the filtration was washed with water and recrystallized from alcohol, whereby there was obtained 174 grams of the beta-hydroxy-ethyl ether of 4-hydroxy-benzophenone as a white, crystalline compound melting at 82.5° to 83.5° C.

Example 2

92.9 grams (0.4 mol) of 3-chloro-4-hydroxy-benzophenone was dissolved in 100 milliliters of water and 85 milliliters of 5.0 normal sodium hydroxide solution. The mixture was thereafter warmed to 65° C. and 46.2 grams of ethylene chlorohydrin added thereto with stirring. The reaction mixture was maintained at temperatures ranging between 90° C. and 100° C. for 4.5 hours, at the end of which time an oily layer separated from the mixture. This oily layer was separated by decantation, washed with water, and fractionally distilled, whereby there was obtained the beta-hydroxy-ethyl ether of 3-chloro-4-hydroxy-benzophenone as an amber oil boiling at approximately 240° C. at 0.3 inch pressure. Upon standing, this oil showed a tendency to crystallize. This product was analyzed and found to contain 12.9 per cent by weight of chlorine as compared to a theoretical chlorine content of 12.8.

In a similar manner, and by substituting other hydroxy-benzophenones and halogenated hydroxy-benzophenones for those shown in the examples, there may be prepared such compounds as beta-hydroxy-ethyl ether of 4'-chloro-4-hydroxy-benzophenone, beta-hydroxy-ethyl ether of 3,4'-dichloro-4-hydroxy-benzophenone, beta-hydroxy-ethyl ether of 3-bromo-4-hydroxy-benzophenone, beta-hydroxy-ethyl ether of 2-hydroxy-3,5,6-trichloro-benzophenone, hydroxy-butyl ether of 2', 4', 6'-trichloro-4-hydroxy-benzophenone, hydroxy-amyl ether of 3,5-dibromo-4-hydroxy-benzophenone, hydroxy-propyl ether of 3-chloro-4'-bromo-4-hydroxy-benzophenone, beta-hydroxy-ethyl ether of 2-hydroxy-benzophenone, beta-hydroxy-ethyl ether of 2-hydroxy-3-chloro-benzophenone, and the like.

The compounds with which this invention is particularly concerned are those having the following formula

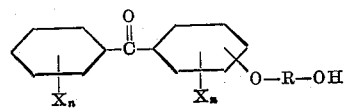

wherein R represents an alkylene radical containing from 2 to 5 carbon atoms, inclusive, each X represents a member of the group consisting of chlorine, bromine, and hydrogen, and each $n$ is an integer not greater than 3.

We claim:

1. A compound having the formula

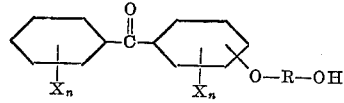

wherein R represents an alkylene radical containing from 2 to 5 carbon atoms, inclusive, each X represents a member of the group consisting of chlorine, bromine, and hydrogen, and each $n$ is an integer not greater than 3.

2. A beta-hydroxy-ethyl ether having the formula

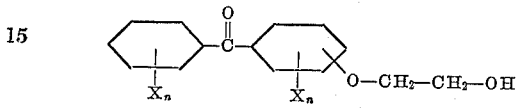

wherein each X represents a member of the group consisting of chlorine, bromine, and hydrogen, and each $n$ is an integer not greater than 3.

3. A beta-hydroxy-ethyl ether having the formula

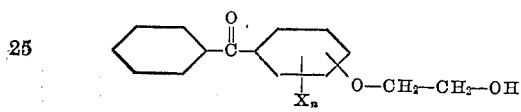

wherein X represents a member of the group consisting of chlorine, bromine, and hydrogen, and $n$ is an integer not greater than 3.

4. A beta-hydroxy-ethyl ether having the formula

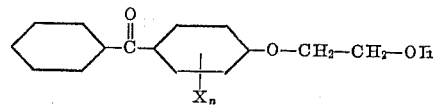

wherein X represents a member of the group consisting of chlorine, bromine, and hydrogen, and $n$ is an integer not greater than 3.

5. A beta-hydroxy-ethyl ether having the formula

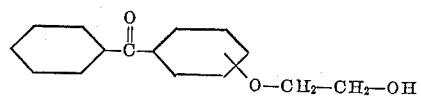

6. The beta-hydroxy-ethyl ether of 4-hydroxy-benzophenone.

7. The beta-hydroxy-ethyl ether of 3-chloro-4-hydroxy-benzophenone.

GERALD H. COLEMAN.
CLARENCE L. MOYLE.